(12) United States Patent
McKay (10) Patent No.: US 6,688,429 B2
(45) Date of Patent: Feb. 10, 2004

(54) PORTABLE WILDLIFE OBSERVATION AND HUNTING TOWER

(76) Inventor: Kelvin McKay, Box 154, Cumberland House, SK (CA), S0E 0S0

( * ) Notice: Subject to any disclaimer, the term of this patent is extended or adjusted under 35 U.S.C. 154(b) by 0 days.

(21) Appl. No.: 10/150,708

(22) Filed: May 17, 2002

(65) Prior Publication Data

US 2003/0111294 A1 Jun. 19, 2003

(30) Foreign Application Priority Data

Dec. 13, 2001 (CA) ............................................. 2368402

(51) Int. Cl.$^7$ ............................................. A01M 31/00
(52) U.S. Cl. ..................................... 182/127; 182/63.1
(58) Field of Search ............................... 182/127, 63.1, 182/115

(56) References Cited

U.S. PATENT DOCUMENTS

| | | | | |
|---|---|---|---|---|
| 4,529,063 A | * | 7/1985 | Kishi | .......................... 187/244 |
| 5,105,908 A | | 4/1992 | Freund | |
| 5,111,907 A | * | 5/1992 | Kishi | ........................ 182/69.4 |
| 5,295,555 A | | 3/1994 | Strange | |
| 5,314,042 A | | 5/1994 | Adams | |
| 5,371,966 A | * | 12/1994 | Hall | ................................ 43/1 |
| 5,564,523 A | | 10/1996 | Howard | |
| 5,566,780 A | | 10/1996 | Bambrough | |
| 5,839,538 A | | 11/1998 | Magyar | |
| 6,186,271 B1 | | 2/2001 | Borries et al. | |
| 6,290,023 B1 | * | 9/2001 | Martin | ........................ 182/127 |
| 6,523,641 B2 | * | 2/2003 | Smith | ........................ 182/63.1 |

* cited by examiner

*Primary Examiner*—Alvin Chin-Shue
(74) *Attorney, Agent, or Firm*—Patterson, Thuente, Skaar & Christensen, P.A.

(57) ABSTRACT

A portable tower apparatus, convertible between a lowered transport configuration and a raised observation configuration, useful for observing wildlife and hunting, comprising an elongate main member that functions as the main structural element of a trailer assembly when the apparatus in deployed in the lowered transport configuration, and the main structural element of a free-standing tower, when the apparatus is deployed in the raised observation configuration. The apparatus is deployed in the raised tower configuration by tipping the main member up, so that the base members, attached to one end thereof, rest on the ground, attaching the platform to the other end of the main member, and attaching the brace, which is also a ladder, to the platform.

18 Claims, 8 Drawing Sheets

PORTABLE WILDLIFE OBSERVATION AND HUNTING TOWER

BACKGROUND OF THE INVENTION

1. Field of the Invention

Hunters, photographers, and other observers of wild animals benefit from means to disguise or hide themselves or otherwise limit the likelihood of being noticed or recognized by wild animals. Such means permit such persons to approach or remain in reasonably close and effective proximity to wild animals by limiting stimuli of behaviors such as nervousness or purposeful flight by such animals associated with alarm, fear, or stress consequent to known or suspected proximity to man.

The present invention relates to an apparatus designed to permit a person or persons to maintain an elevated position with respect to wild animals and to transport game animals, wildlife observation and hunting equipment, and other materials. In particular, the present invention relates to a portable apparatus that can be configured as a freestanding wildlife observation and hunting tower and, alternatively, as a wheeled transporter that can be readily maneuvered by an individual or towed by a powered vehicle or draught animal, and that can be easily converted from one such configuration to the other.

2. Description of the Related Art

The application of elevated platforms or stands for wildlife observation and hunting wild animals is commonly known to hunters, wildlife photographers, and other observers of wild animals in the natural habitat of such animals. Also known are elevated platforms or stands designed for such purposes that can be reconfigured to permit transport by an individual or a powered vehicle.

U.S. Pat. No. 5,105,908 to Freund discloses a ladder apparatus to which may be attached a platform. The ladder and platform may be collapsed and, in such collapsed configuration attached to either a wheel or ski assembly and to a motorized vehicle for transport. U.S. Pat. No. 5,314,042 to Adams discloses a hinged sectional ladder and platform assembly that may, when folded for transport be attached to front and rear wheel and axle assemblies. U.S. Pat. No. 5,566,780 to Bambrough describes a ladder-based cart apparatus with an attachable platform that may, for transport, be pushed or pulled on wheel assemblies. U.S. Pat. No. 5,839,538 to Magyar discloses a foldable portable stand comprised of top and bottom ladder sections hinged to each other and a platform connected to the top ladder section. The ladder sections, platform, and ancillary supporting members can be folded together and, in that conformation, pushed or pulled by an individual on wheels attached to lower ladder section. None of the stands described in U.S. Pat. Nos. 5,105,908, 5,314,042, 5,566,780, and 5,839,538 are free standing when assembled for use as stands, as such. Rather, all require support from a tree or other substantial vertical support when so configured.

U.S. Pat. No. 5,295,555 to Strange teaches a wheeled trailer chassis including a flat load bed for carrying an all-terrain vehicle and attached lift booms that can be raised from a horizontal position with hydraulic cylinders anchored to the trailer chassis and the lift booms. Attached to the lift booms, at the ends distal to the trailer-chassis attachment points is a platform. U.S. Pat. No. 5,564,523 to Howard discloses a scaffold structure that, when assembled on a trailer chassis, supports a raised platform stabilized by support lines. The platform, scaffolding members, and support lines, when dissembled may be packed onto the trailer chassis for transport. Drawbacks of stands such as those described by U.S. Pat. Nos. 5,295,555, and 5,564,523 are that: (i) the "footprint" of each is relatively large, being equal to the size of the trailer chassis as such trailer chassis is configured for transport; (ii) they require the use of a motorized vehicle to transport the stand to and from hunting or observation sites, thereby limiting their utility to locations accessible to such vehicles; (iii) respecting U.S. Pat. No. 5,295,555, the need to support the weight of an all-terrain vehicle and the inclusion of hydraulic components make such stands mechanically complex and heavy; and (iv) respecting the U.S. Pat. No. 5,564,523, the application of scaffolding requires a relatively large number of parts, and the erect stand must be stabilized with support lines.

U.S. Pat. No. 6,186,271 to Borries and Scarborough reveals a collapsible hunting stand and game-carrier assembly comprising a seat supported by three or more legs. The stand collapses and folds up for transport, giving rise to a considerable number of hinges and like parts that are subject to wear and failure.

SUMMARY OF THE INVENTION

It is an object of the present invention to provide a portable tower apparatus that is simpler and more convenient to assemble, use, and transport than prior towers. It is a further object of the present invention to provide such a tower apparatus that includes a larger platform that is stabilized to support one or more persons in an elevated location. It is a further object of the present invention to provide such a tower apparatus that includes a camouflage cover for the platform.

The present invention provides a portable tower apparatus, convertible between a lowered transport configuration and a raised observation configuration, said apparatus comprising: an elongate main member, oriented substantially vertically when the apparatus is in the raised observation configuration, and oriented substantially horizontally when the apparatus is in the lowered transport configuration; a plurality of base members attached at proximal ends thereof to a first end of the main member, said base members being oriented substantially perpendicular to a longitudinal axis of the main member; a platform attached, when the apparatus is in the raised observation configuration, to a second end of the main member such that a top surface of the platform is oriented substantially perpendicular to the longitudinal axis of the main member, and attached, when the apparatus is in the lowered transport configuration, to the main member; a brace element, attached, when the apparatus is in the raised observation configuration, to the platform such that the brace element extends from the platform downward and away from the main member to the ground and such that a lower end of the brace element rests on the ground, and attached, when the apparatus is in the lowered transport configuration, to the main member; and at least one wheel attached to the apparatus, when the apparatus is in the lower transport configuration, so as to support the apparatus for movement along the ground.

When the apparatus is deployed in the lowered transport configuration, towing means, such as a trailer hitch, handle, or harness can be removably attached to the second end of the main member, or alternatively, the first end of the main member, such that the apparatus may be pulled or pushed over the ground by an individual, draught animal or powered vehicle. To achieve the conversion between the lowered transport configuration and the raised observation configuration, the main member can be tipped upright such that, in the latter-said configuration the first end of the main member and the supporting base members attached thereto rest on the ground.

It is anticipated that a useful embodiment of the invention would include means to adjust the height of the platform above the ground when the apparatus is deployed in the raised observation configuration. Therefore, the main member can be adjustable. For example, the main member can comprise a plurality of elongate main member elements that can be attached together such that the length of the attached-together main member elements can exceed the length of any one main member element. Embodiments of such main member elements include telescoping elements and elements that are attachable end to end or at midpoints of overlapping portions thereof such that, together, the elements so attached comprise a substantially collinear array.

Stabilization of the apparatus in the raised observation configuration is provided by attaching to the platform one end of a brace, which brace extends downward from the platform and away from longitudinal axis of the main member such that an end thereof, distal from the platform attachment point or points, rests upon the ground. Useful embodiments of the brace element include climbing means, such as a plurality of bars, rings, rungs or other like structures, or the brace can be a ladder. In embodiments of the invention employing a main member of extendible length, as described above, it will be required that the brace be also so extendible.

The apparatus can be further stabilized in the raised observation configuration by extending the functional length of at least one base member by attaching thereto at least one elongate base-member extension such that, when the apparatus is in the raised observation configuration, a base member and attached base-member extension extend further from the main member than a distal end of such base member.

A preferred embodiment of the invention includes a wheel and axle assembly comprising an axle with a wheel rotateably mounted at each end thereof and wherein a midpoint of the axle is attached to a midpoint of the main member such that the axle extends transversely to the main member. When the apparatus is deployed in the horizontal transport configuration, use of such a wheel and axle assembly stabilizes and makes the apparatus easily maneuverable on the ground during transport and when stationary.

A preferred embodiment of the wheel and axle assembly includes means to attach a midpoint of the axle to a plurality of midpoints of the main member such that, when attached at each such midpoint of the main member, the axle extends transversely to the main member. For example, to a midpoint of the axle of the wheel and axle assembly can be attached a collar that the main member can be inserted through. The collar should closely encircle the main member such that the position of the collar on the main member and, hence, the position of the attached wheel and axle assembly, can be slideably adjusted.

Whereas attachment of the wheel and axle assembly, as stated above, to a first midpoint of the main member, can be accomplished for transport, the wheel and axle assembly can be used to stabilize the platform in respect of the main member, when the apparatus is deployed in the raised observation configuration, by attachment of the wheel and axle assembly to a second midpoint on the main member proximal to the second end of the main member such that, points on a lower surface of the platform distal from the main member attachment position thereon abut the wheels, and the platform is thereby supported by the wheels. This embodiment of the invention provides to the platform greater stability when atop the second end of the main member, than embodiments lacking such second midpoint wheel and axle assembly attachment.

In certain embodiments of the apparatus, the first above-said midpoint of the main member and the second above-said midpoint of the main member can be the same midpoint of the main member. In such embodiments, it is anticipated that, when deployed in the horizontal transport configuration, the apparatus would be most efficiently transportable using towing means attached at the first end on the main member.

Preferred embodiments of the platform comprise means to removably attach a seat and/or a gun rest on the upper surface thereof, for use by a person or persons on the platform when the apparatus is deployed in the raised observation configuration. Such seat and/or gun rest can be mounted at any position or positions on the platform that suit the requirements of a user of the apparatus, and can be mounted so as to permit pivotal rotation thereof, to convenience a desired field of view and/or aiming by a user of the apparatus. Preferred embodiments of the platform also comprise means to removably attach camouflage means such as a rigid-walled enclosure, fabric enclosure or tent, so that, when so comprised, a person atop the platform is not readily viewable from positions exterior to such camouflage means.

To further facilitate transport of the apparatus, preferred embodiments thereof include at least one carrier bracket attachable to a midpoint on the main member and comprising at least one carrier arm extending laterally from that least one side of the longitudinal axis of the main member. When so attached to the main member, when the apparatus is deployed in the horizontal transport configuration, elements of the invention, such as the platform, the brace, base member extensions, camouflage means, a seat, a gun rest, and a harvested game animal can be stably supported thereon. Such items supported on carrier bracket or brackets can be secured for transport by, for example, tying the same to the carrier bracket or brackets and/or the main member with at least on rope, cord, belt, strap, bungie cord, or like material. A preferred embodiment of the invention comprises at least two carrier brackets.

These and other objects, features, and advantages of the invention become further apparent in the following detailed description of the invention when taken in conjunction with the accompanying drawings which illustrate, by way of example, the principles of this invention.

BRIEF DESCRIPTION OF THE DRAWINGS

While the invention is claimed in the concluding portions hereof, preferred embodiments are provided in the accompanying detailed description which may be best understood in conjunction with the accompanying drawings where like parts in each of the several drawings are labeled with like numbers, and where:

DETAILED DESCRIPTION OF THE INVENTION

Figure 1:
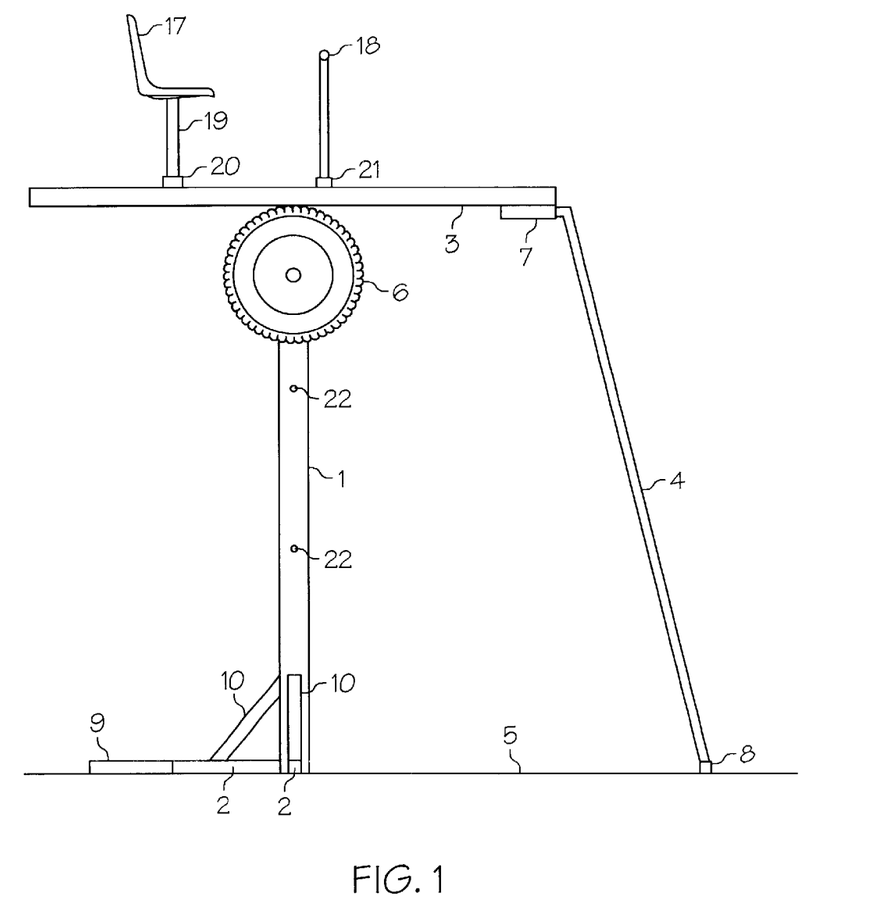
FIG. 1 is a side view of a portable wildlife observation and hunting tower apparatus in accordance with an embodiment of this invention, depicted fully deployed in a freestanding raised observation configuration.
Figure 2:
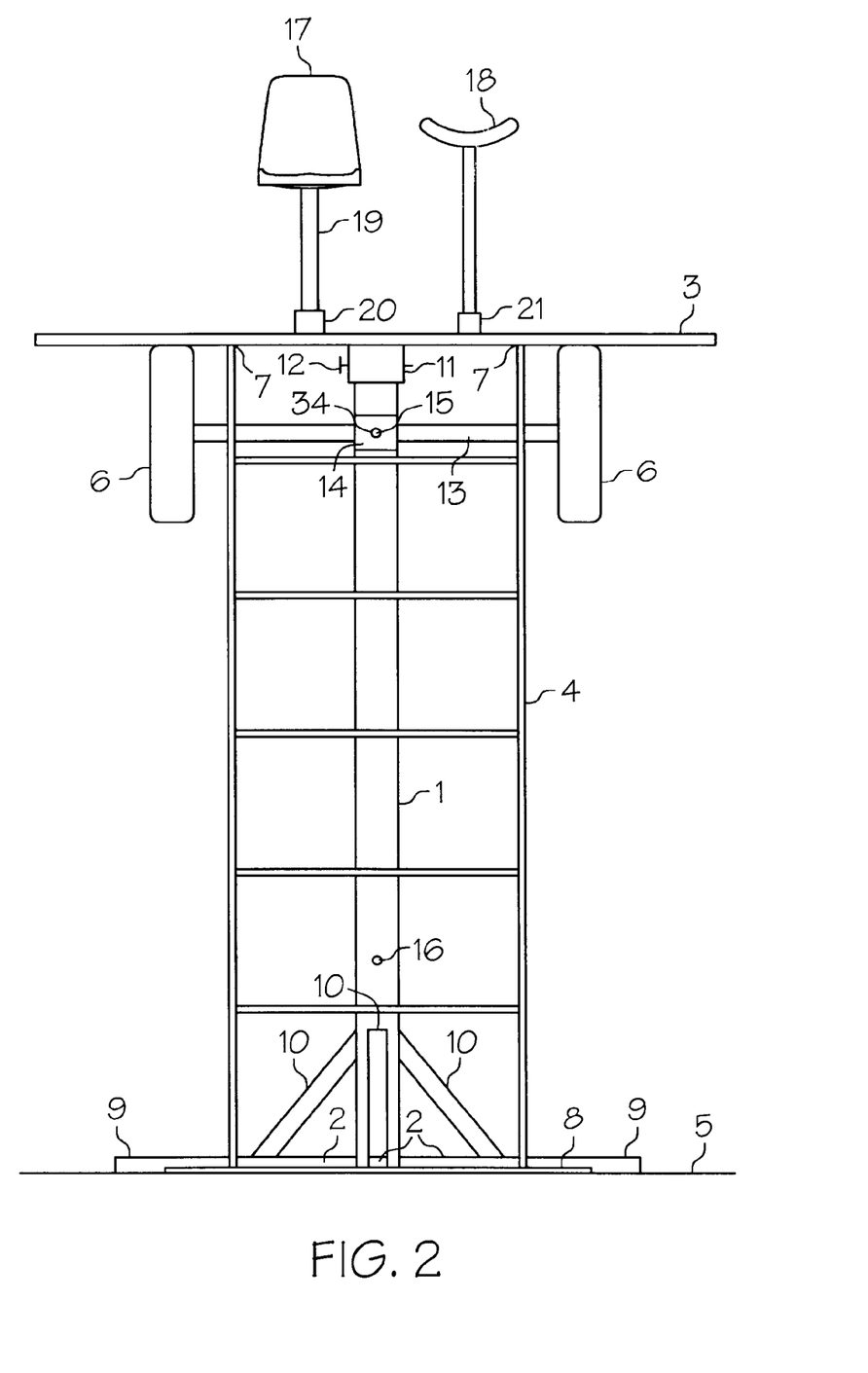
FIG. 2 is a front view of the apparatus of FIG. 1.

FIGS. 1 and 2 show, respectively, side and front views of a portable wildlife observation and hunting tower apparatus fully deployed in a raised observation configuration and comprising: an elongate main member 1 oriented substantially vertically; a plurality of base members 2 attached at proximal ends thereof, to a first end of the main member, said base members 2 being oriented substantially perpendicular to a longitudinal axis of the main member 1; a platform 3 attached to a second end of the main member 1 such that a top surface of the platform 3 is oriented substantially perpendicular to the longitudinal axis of the main member 1; a brace 4 attached to the platform 3 such that the brace 4 extends from the platform 3 downward and away from the main member 1 to the ground 5 and such that a lower end of the brace 4 rests on the ground 5. Whereas the main member 1 supports the weight of the platform 3, a person or persons, and things atop the platform 3, the base members 2 and the brace 4 stabilize the main member 1 and the platform 3 in relation to the ground 5, such that the apparatus, when so deployed, is freestanding and capable of supporting, on the platform 3, the weight of at least one person and sufficient equipment or other things to permit such person to usefully participate in activities such as hunting and wildlife observation.

The brace 4 comprises a ladder structure, to permit access by a person to the platform 3 by climbing from the ground 5. In the illustrated embodiment, such brace 4 is attached at upper ends thereof to brace-end receptacles 7 attached to the platform. To prevent the lower end of the brace 4 from sinking into the ground 5, a brace base 8 is attached thereto.

The functional length of a base member 2 and, hence, the stability of the apparatus, can be increased by attaching, when the apparatus is in the raised observation configuration, at lease one elongate base-member extension 9, to a base member 2 so as to extend further from the main member than a distal end of such base member 2.

Attached to a midpoint on each base member 2 and to a midpoint on the main member 1, is a base-member brace 10, for securing and stabilizing the angle of attachment between each base member 2 and the main member 1.

Also shown is means for attaching the main member 1 to the platform 3. In the illustrated embodiment, fixed to a lower surface of the platform is a main-member receptacle 11 into which the main member 1 can be slideably inserted and therein affixed by, for example, passing a bolt 12 or pin through aligned holes in the main-member receptacle 11 and main member 1. Other known means for attaching a substantially vertical member to a substantially horizontal member can also be employed to attach the platform 3 to the main member 1.

To stabilize the platform in relation to the main member, the illustrated embodiment of the invention has a wheel 6 and axle 13 assembly comprising an axle 13 with a wheel 6 rotatably mounted at each end thereof and wherein a midpoint of the axle 13 is attached to the main member 1, at a second midpoint thereof, such that the axle 13 extends transversely to the main member 1 and such that a lower surface of the platform 3 abuts and is supported by the wheels 6. Attachment of the wheel 6 and axle 13 assembly to the main member 1 can be accomplished by attaching to a midpoint of the axle 13 a collar 14 that is attachable to the main member 1 by, for example, passing a bolt 15 or pin through aligned holes in the main member 1 and collar 14. In preferred embodiments of this invention the wheel 6 and axle 13 assembly can be attached to a plurality of points on the main member 1 along its longitudinal axis. Illustrated in FIG. 2, as a hole in the main member 1 at a first midpoint thereof, is an axle-attachment point 16 for use when the tower is deployed in the horizontal transport configuration.

The platform 3 has means for attaching a seat 17 upon which at least one hunter or wildlife observer can sit, and/or a gun rest 18 for supporting at least one gun or camera, for example. In the embodiment of the apparatus illustrated in FIGS. 1 and 2, such seat 17 is depicted as a chair connected to the platform 3 by means of a seat support 19, an upper end of which is attached to the seat and a lower end of which is attached to a seat-support receptacle 20, itself affixed to the upper surface of the platform 3. Similarly, the gun rest 18 is shown attached a gun-rest receptacle 21, which gun-rest receptacle is attached to the upper surface of the platform 3. Preferred embodiments of the seat 17, seat support 19, and seat-support receptacle 20 assembly, and the gun rest 18, gun-rest receptacle 21 assembly, such as those illustrated here, permit each of the seat 17 and gun rest 18 to rotate in a horizontal plane parallel to the upper surface of the platform 3, to allow flexibility of movement to a user of the apparatus. In FIG. 2, the seat 17, seat support 19, and seat-support receptacle 20 assembly, and the gun rest 18, gun-rest receptacle 21 assembly are shown displaced horizontally from one another on the platform 3. However, it is anticipated that such assemblies can be situated at any positions on the platform 3 that suit the requirements of a user of the apparatus.

Shown in FIG. 1, as holes in the main member 1 are carrier bracket attachment points 22, used for attachment of carrier brackets to the main member 1 when the apparatus is deployed in the horizontal transport configuration.

Figure 3:
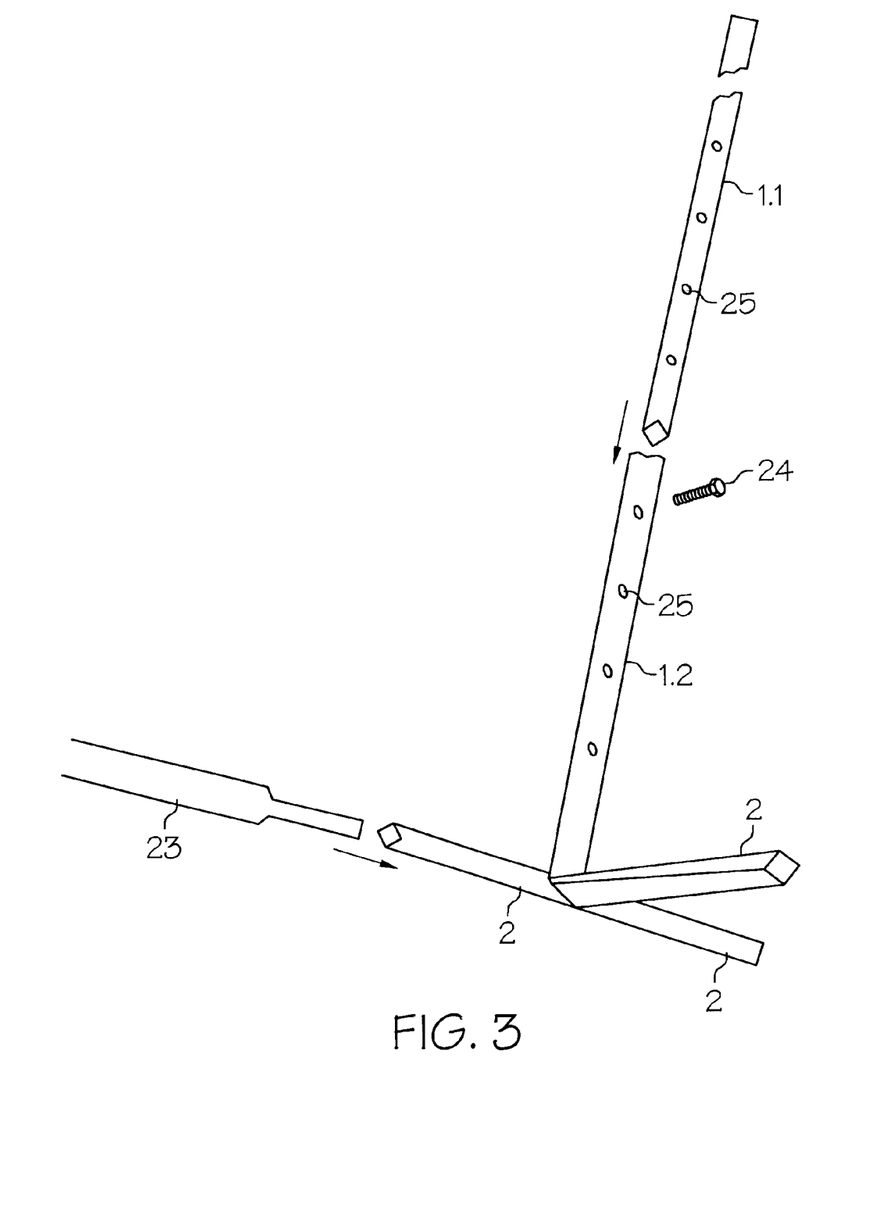
FIG. 3 is a schematic perspective view of a main member of the wildlife observation and hunting tower apparatus, comprising a plurality of elongate main member components and one means to selectively adjust the length of the main member. Also illustrated are base members attached to an end the main member, a base-member extension, and one means to attach such base-member extension to a base member.

FIG. 3. illustrates means for extending the functional length a base member 2 and for adjusting the length of the main member 1. In the illustrated embodiment, base members 4 are hollow and, into an end of each, distal from the main member 1, can be inserted a suitably fitted end of a base-member extension 23. Other means for attaching an elongate structure to another elongate structure, such that the aggregate length of such attached assembly is greater that the length of either such structure alone, such as clamps, bolts, or pins, can also be employed for this purpose.

The length of the main member can be adjusted by, for example, forming a main member with a plurality of attached main member components. In the embodiment illustrated in FIG. 3, an inner main member component 1.1 can be slideably inserted within the lumen of a hollow outer main member component 1.2. The length of the inner main member component 1.1, outer main member component 1.2 assembly can be adjusted by telescoping the said components. The length of the said assembly can be variably fixed by attaching the inner main member component 1.1 to the outer main member component 1.2 at at least one selected and overlapping midpoint of each such component by, for example, passing a bolt 24 or pin through aligned holes 25 in each such main member component.

Figure 4:
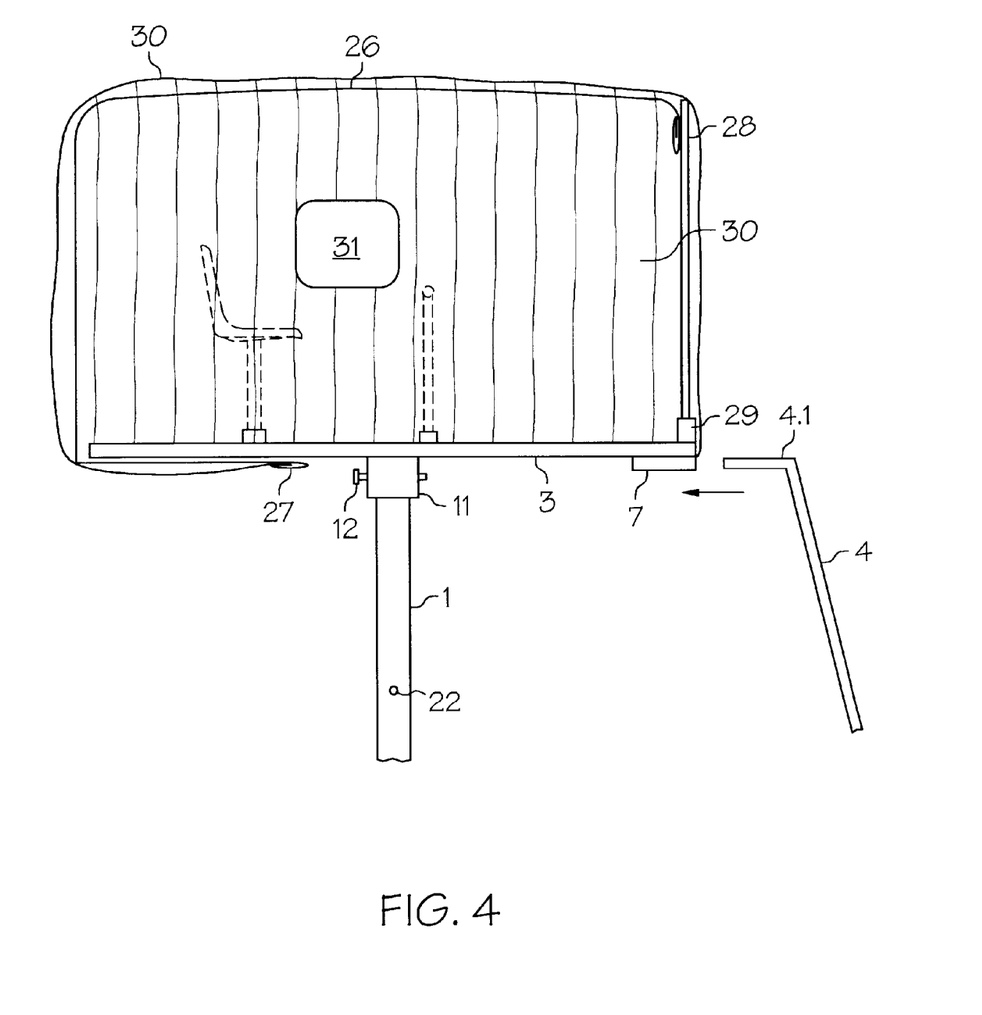
FIG. 4 is a side view of the apparatus of FIG. 1 depicting an upper portion of the main member, a platform, means for attaching the platform to the main member, means for attaching a brace to the platform, with camouflage means in the form of a tent structure added to the platform.

FIG. 4 illustrates an upper portion of the apparatus deployed in the raised observation configuration and as viewed from a side, including the platform 3, an upper portion of the main member 1, and an upper portion of the brace 4. Shown is means for attaching an end of the brace 4 to the platform 3, comprising a brace end 4.1 that can be slideably inserted into a brace-end receptacle 7 attached to the platform 3. Alternatively, the brace 4 and the platform 3 can be attached to one another by other known means such as bolting or clamping.

The apparatus can comprise means to camouflage an area above the platform, which means can include a fabric enclosure or tent. Illustrated in FIG. 4 is an embodiment of this invention employing such camouflage means. Using known means, a plurality of tent-support rods 26, one of which is shown, radiate from a support-rod-attachment 27 affixed to a lower surface of the platform 3. Tent-support rods 26 are formed so as to extend from the support-rod attachment 27, over the upper surface of the platform, to a support post 28 attached to a site on or near an edge of the upper surface of the platform 3. The support post 28 is removably attached to such upper surface by, in the illustrated embodiment, slideable insertion into a support-post receptacle 29 fixed to the platform. Fabric camouflage material 30 can be draped over and/or sewn to the tent-support rods 26. The fabric camouflage material 30 can contain an aperture 31 for viewing or shooting through.

Figure 5:
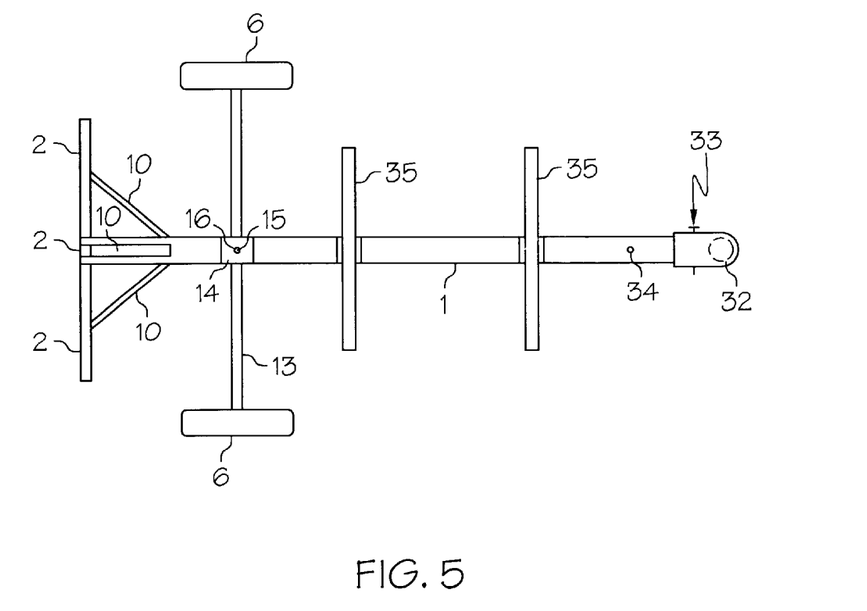
FIG. 5 is a top view of the embodiment of FIG. 1 deployed in the horizontal transport configuration, but with the platform, the brace, and base-member extensions removed, illustrating attachment of a wheel and axle assembly at a first midpoint of the main member and means for towing the apparatus from a second end of the main member.
Figure 6:
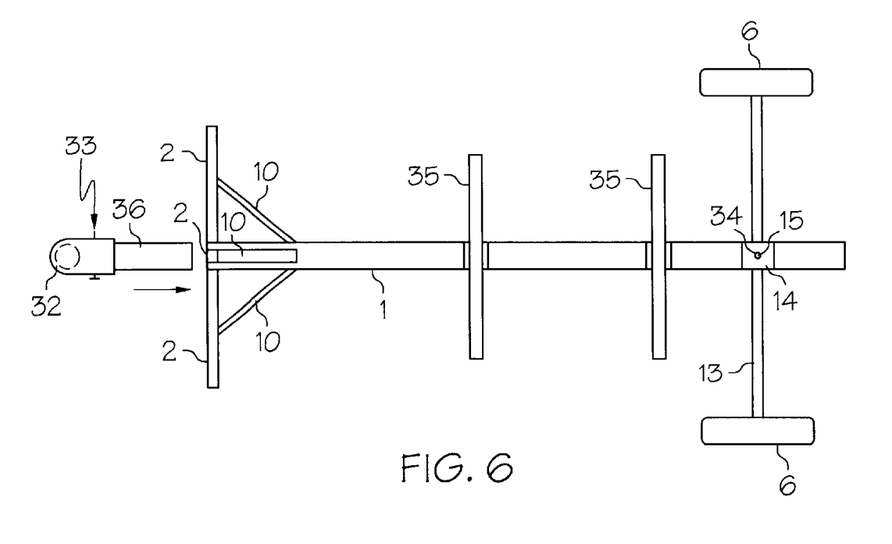
FIG. 6 is a top view of an alternate embodiment depicted deployed in the horizontal transport configuration, but with the platform, the brace, and base-member extensions removed, illustrating attachment of a wheel and axle assembly at a second midpoint of the main member and means for towing the apparatus from a first end of the main member.

FIGS. 5 and 6 show top views of embodiments of a wildlife observation and hunting tower apparatus deployed in a horizontal transport configuration but without the brace 4, or platform 3 attached. Attached to a first end of the main member 1 are base members 2 and, between such base members 2 and the main member 1, base-member braces 10.

In the embodiment illustrated in FIG. 5, a trailer hitch 32 is attached to the second end of the main member 1 by means of a bolt 33 that traverses aligned holes in the trailer hitch 32 and in the main member 1. In other embodiments, towing or pushing means other than a trailer hitch 32, such as a handle, rope or harness, may be so employed. Also shown are a wheel 6 and axle 13 assembly comprising an axle 13 and a wheel 6 rotatably mounted at each end thereof and wherein a midpoint of the axle 13 is attached at a first midpoint of the main member 1 such that the axle 13 extends transversely to the main member 1. Such first midpoint of the main member 1 is, in the illustrated embodiment, distinct from the second midpoint thereof, used for attachment of the wheel 6 and axle 13 assembly when the apparatus is deployed in the raised observation configuration as shown in FIGS. 1 and 2. Depicted in FIG. 5, as a hole in the main member 1 at a second midpoint thereof is such axle-attachment point 34 for use when the tower is deployed in the upright observation configuration. Also shown are carrier brackets 35 attached to the main member 1 at midpoints 22 thereof.

FIG. 6 illustrates an alternate embodiment where towing means are attached to the first end of the main member 1. Where the main member 1 is tubular or similarly hollow, a first end of an elongate towing arm 36 can be inserted into such lumen and secured there such that sufficient of the length of such towing arm 36 protrudes from the lumen of the main member 1 to permit efficient towing, or moving of the apparatus otherwise, by a person, draught animal or powered vehicle. For example, means of so securing the towing arm 36 to the main member 1 can include the insertion of a bolt or pin through aligned holes in the main member 1 and the towing arm 36 or other known means for attaching an elongate structure to another elongate structure, such that the aggregate length of such attached assembly is greater that the length of either such structure alone. When towing means are attached at the first end of the main member 1, it is preferred to attach the wheel 6 and axle 13 assembly to the main member 1 at second midpoint of the main member 1, located nearer the second end thereof than a wheel 6 and axle 13 attachment point preferred when towing means are attached at the second end of the main member 1. The embodiment of the apparatus depicted in FIG. 6 shows the wheel 6 and axle 13 assembly attached to the main member 1 at the same midpoint as that used when the wheels are supporting the platform 3 in the raised configuration.

Figure 7:
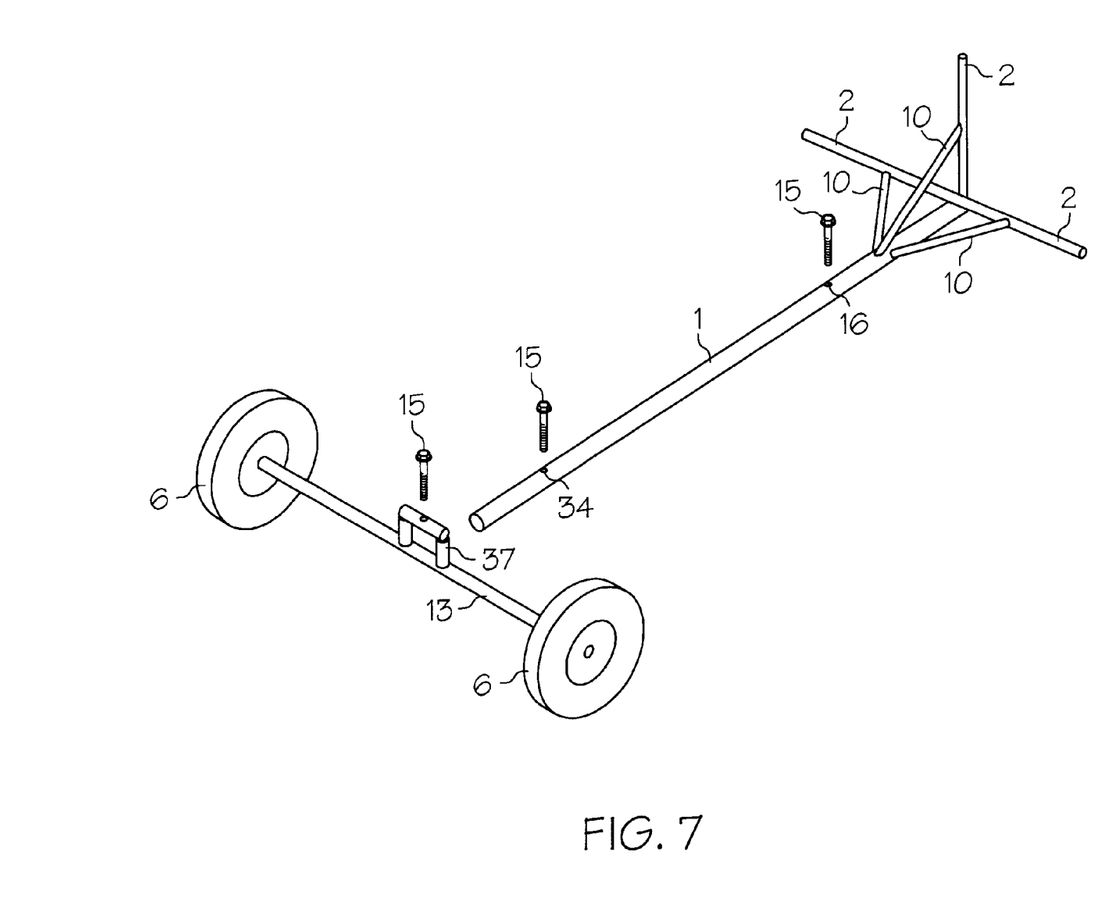
FIG. 7 is a perspective view depicting means to slideably attach the wheel and axle assembly to the main member at a plurality of attachment points.

FIG. 7 illustrates one means for attaching a wheel 6 and axle 13 assembly to the main member 1 of a portable wildlife observation and hunting tower apparatus at a plurality of attachment points by slideably inserting the main member 1 through the lumen of a collar 37 attached to the axle 13 at a midpoint thereof. The wheel 6 and axle 13 assembly can be affixed to the main member at any desired point thereon by, for example, inserting a bolt 15 or pin through aligned holes in the main member 1 and collar 37.

Figure 8:
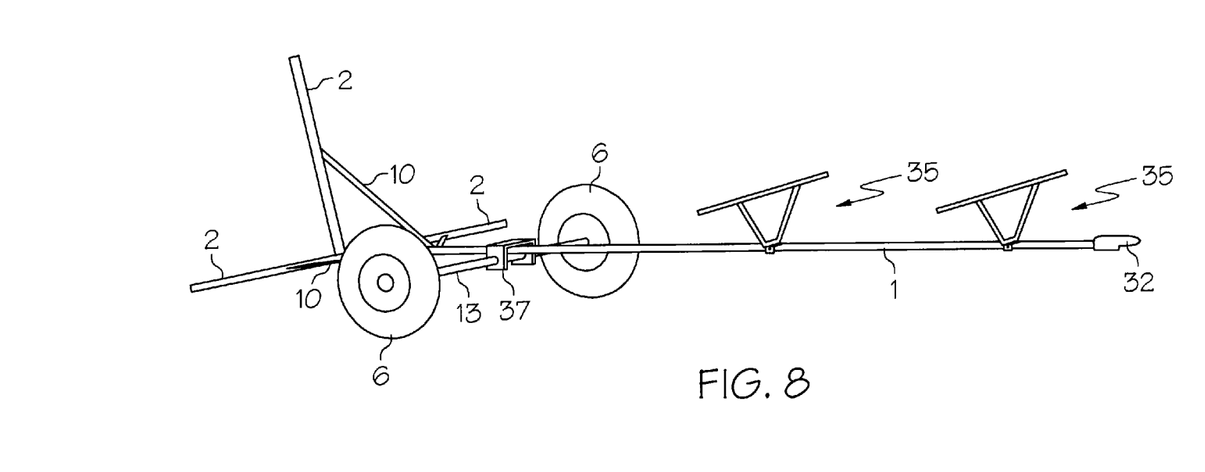
FIG. 8 is a perspective view of the apparatus of FIG. 5 illustrating the attachment of carrier brackets to the main member of the apparatus.

FIG. 8 shows a portable wildlife observation and hunting tower apparatus deployed in a horizontal transport configuration but without the brace 4, or platform 3. Shown are carrier brackets 35 for supporting items during transport, including the brace 4, the platform 3, other equipment or gear, or harvested game animals.

Figure 9:
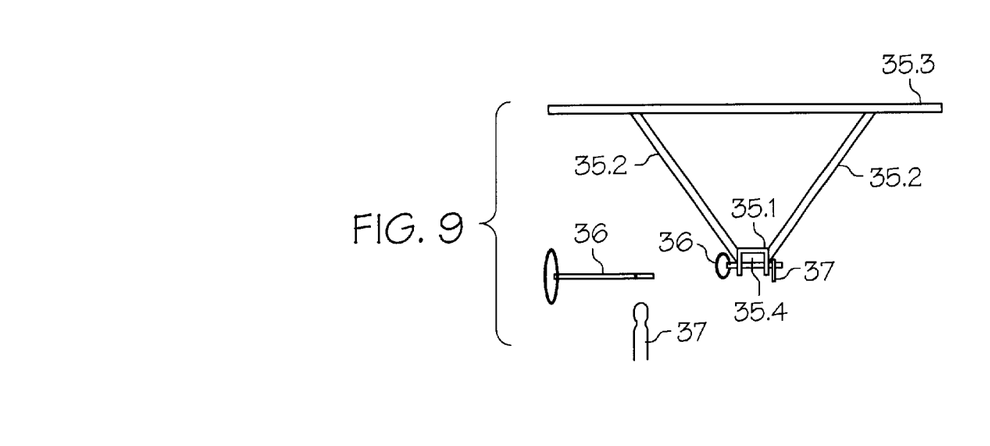
FIG. 9 is a front view of a carrier bracket, depicting means for attaching such bracket to the main member of the apparatus.

FIG. 9 illustrates one means for attaching a carrier bracket 35 to the main member 1. The carrier bracket 35 comprises a carrier bracket cuff 35.1, carrier-arm supports 35.2, and a carrier arm 35.3. The carrier bracket cuff has a lumen 35.4 that is sized such that the main member 1 will fit into such opening. Thus, the main member 1 can be inserted into the a carrier bracket cuff 31.4, and affixed therein, at any desired midpoint of the main member 1 by, for example, inserting a pin 36 or bolt through aligned holes in the carrier bracket cuff 35.1 and such the main member 1. Where a pin 36 is used, as in the illustrated embodiment, such pin can be prevented from accidental removal by securing an end thereof with a clip 37. Each carrier bracket 35 is attached to a midpoint of the main member 1 and comprises at least one carrier arm 35.1 extending laterally from at least one side of the longitudinal axis of the main member 1, as illustrated in FIG. 8.

Figure 10:
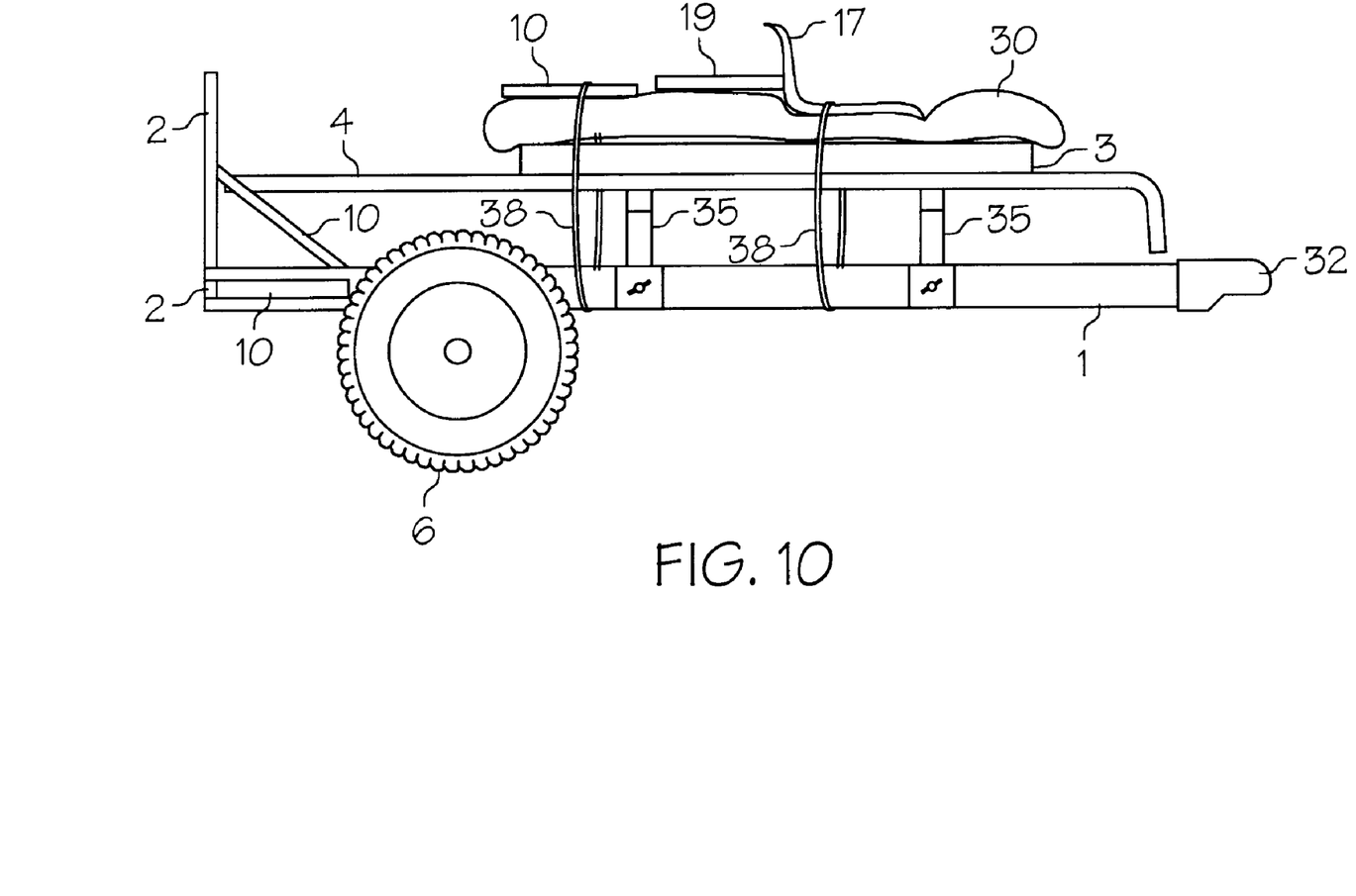
FIG. 10 is a side view as in FIG. 5 showing the apparatus fully deployed in the horizontal transport configuration with platform, the brace, and base-member extensions attched for transport.

FIG. 10 shows the tower apparatus fully deployed in a horizontal transport configuration. Shown being supported by carrier brackets 35 attached to the main member 1 are the brace 4, platform 3, fabric camouflage material 30, seat 17 and seat support 19 assembly, and base-member extensions 10. These and other materials, equipment, and harvested game animals can be piled onto the carrier brackets 35 and secured thereon with a rope 38 or any similar material such as a cord, strap, belt, or bungie cord.

The foregoing detailed description of the embodiments of the invention has been provided for the purposes of illustration and description. It is not intended to be exhaustive or to limit the invention to the precise embodiments disclosed. The embodiments where chosen and described to best explain the principles of the invention and its practical application, thereby enabling others skilled in the art of the invention to understand the invention. Whereas the invention has been described with reference to what are presently considered to be the most practical and preferred embodiments, it is understood that the invention is not limited to the disclosed embodiments. On the contrary, the invention is intended to encompass various modifications and equivalent arrangements included within the spirit and scope of the appended claims.

What is claimed is:

1. A portable tower apparatus, convertible between a lowered transport configuration and a raised observation configuration, said apparatus comprising:
   (a) an elongate main member:
      (i) oriented substantially vertically with a first end thereof on the ground when the apparatus is in the raised observation configuration; and
      (ii) oriented substantially horizontally, and attachable to towing means at one end thereof and attached to wheels for movement along the ground, when the apparatus is in the lowered transport configuration;
   (b) a plurality of base members attached at proximal ends thereof to the first end of the main member, said base members extending outward and substantially perpendicular a longitudinal axis of the main member;
   (c) a platform:
      (i) attached, when the apparatus is in the raised observation configuration, to a second end of the main member such that a top surface of the platform is oriented substantially perpendicular to the longitudinal axis of the main member; and
      (ii) attached, when the apparatus is in the lowered transport to the main member; such that said top surface is substantially parallel to said longitudinal axis
   (d) a brace:
      (i) attached, when the apparatus is in the raised observation configuration, to the platform such that the brace extends from the platform downward and away from the main member to the ground and such that a lower end of the brace rests on the ground; and
      (ii) attached, when the apparatus is in the lowered transport configuration, to the main member.

2. The apparatus of claim 1 wherein the second end of the main member having attachable, when in the lowered transport configuration, to towing means.

3. The apparatus of claim 1 wherein the first end of the main member attachable, when in the lowered transport configuration, to towing means.

4. The apparatus of claim 1 further comprising, when the apparatus is deployed in the lowered transport configuration, at least one carrier bracket for supporting items during transport, such carrier bracket attached to the main member and comprising at least one carrier arm extending laterally from at least one side of the longitudinal axis of the main member.

5. The apparatus of claim 4 comprising two carrier brackets, each carrier bracket comprising a carrier arm extending laterally from each side of the longitudinal axis of the main member and wherein the platform is attached to at least one earner arm.

6. The apparatus of claim 1 wherein the brace comprises a ladder.

7. The apparatus of claim 1, wherein the apparatus comprises an and axle assembly comprising an axle with on of said wheels rotatably mounted at each end thereof and wherein a midpoint of the axle is attached to the main member such that the axle extends transversely to the main member.

8. The apparatus of claim 7 wherein, when the apparatus is in the raised observation configuration, the axle is attached, transversely to the main member, to the main member proximal to the second end of the main member such that a lower surface of the platform abuts and is supported by the wheels.

9. The apparatus of claim 1 further comprising at least one elongate base-member extension that is attached, when the apparatus is in the raised observation configuration, to a base member so as to extend further from the main member than a distal end of such base member.

10. The apparatus of claim 1 wherein the platform further comprises means for attaching a seat.

11. The apparatus of claim 1 wherein the platform further comprised means for attaching a gun rest.

12. The apparatus of claim 1 further comprising means to camouflage an area above the platform.

13. The apparatus of claim 12 wherein the means to camouflage an area above the platform comprises a fabric enclosure.

14. The apparatus of claim 1 wherein a length of the main member is adjustable and a length of the brace is adjustable.

15. A portable tower apparatus, convertible between a lowered transport configuration and a raised observation configuration, said apparatus comprising:
   (a) an elongate main member:
      (i) oriented substantially vertically with a first end thereof on the ground when the apparatus is in the raised observation configuration; and
      (ii) oriented substantially horizontally, and attachable to towing means at one end thereof when the apparatus is in the lowered transport configuration;
   (b) a plurality of base members attached at proximal ends thereof to the first end of the main member, said base members extending substantially horizontally outward from a longitudinal axis of the main member;
   (c) a platform:
      (i) attached to the second end of the main member such that a top surface of the platform is oriented substantially perpendicular to the longitudinal axis of the main member when the apparatus is in the raised observation configuration; and
      (ii) attached to the main member when the apparatus is in the lowered transport configuration such that said top surface is substantially axis parallel to said longitudinal axis;
   (d) a wheel and axle assembly comprising an axle with a wheel rotatably mounted at each end thereof wherein:

(i) the axle is attached transversely to the main member proximal to a second end of the main member such that a lower surface of the platform abuts and is supported by the wheels when the apparatus is in the raised observation configuration; and (ii) the axle is attached transversely to the main member such that the wheels support the apparatus for movement along the ground when the apparatus is in the lowered transport configuration;

(e) a ladder:

(i) attached to the platform such that the ladder extends from the platform downward and away from the main member to the ground and such that a lower end of the ladder rests on the ground and the ladder braces the main member when the apparatus is in the raised observation configuration; and (ii) attached to the main member when the apparatus is in the lowered transport configuration.

16. The apparatus of claim 15 further comprising at least one elongate base-member extension attached to a base member so as to extend further from the main member than a distal end of such base member, when the apparatus- is in the raised observation configuration.

17. The apparatus of claim 15 wherein the axle is attached transversely to the main member at the same location when the apparatus is in the raised observation configuration and when the apparatus is in the lowered transport configuration.

18. The apparatus of claim 15 wherein a length of the main member is adjustable and a length of the ladder is adjustable.

* * * * *